Patented May 29, 1923.

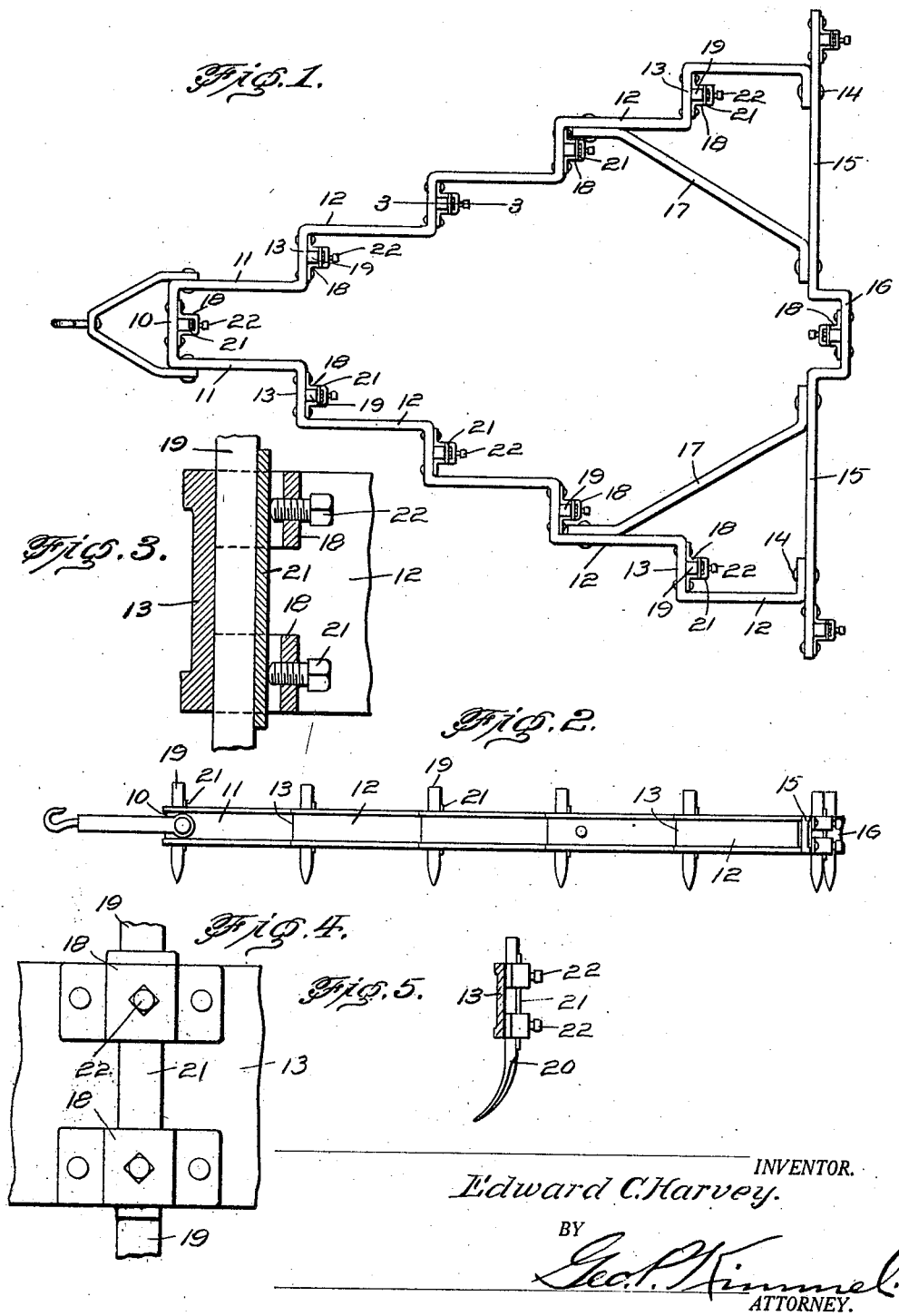

1,457,165

UNITED STATES PATENT OFFICE.

EDWARD C. HARVEY, OF FRANKLINTON, LOUISIANA.

CULTIVATOR.

Application filed October 5, 1922. Serial No. 592,502.

*To all whom it may concern:*

Be it known that I, EDWARD C. HARVEY, a citizen of the United States, residing at Franklinton, in the parish of Washington and State of Louisiana, have invented certain new and useful Improvements in Cultivators, of which the following is a specification.

This invention relates to combined cultivators and harrows, and has for one of its objects to increase the efficiency and utility of devices of this character.

Another object of the invention is to provide a device of this character comprising a rigid supporting frame enlarged toward the rear and with means for coupling cultivator or harrow teeth alternately thereto without changing the supporting frame.

With these and other objects in view, the invention consists in certain novel features of construction as herein shown and described and specifically pointed out in the claims, and in the drawings illustrative of the preferred embodiment of the invention.

Fig. 1 is a plan view of the improved implement.

Fig. 2 is a side elevation.

Fig. 3 is an enlarged sectional detail on the line 3—3 of Fig. 1.

Fig. 4 is a rear elevation of the parts shown in Fig. 3.

Fig. 5 is a sectional detail illustrating the manner of coupling a conventional cultivator standard and shovel to the implement.

The improved implement is adapted to support harrow teeth or cultivator standards of various forms, and includes a main supporting frame formed from a single bar, preferably of channel steel and bent intermediate the ends to form a short transverse portion 10 and rearwardly extending portions 11, the latter in spaced parallel relation, as shown in Fig. 1.

Rearwardly of the portions 11 the bar is directed in reversely diverging sections each formed of alternating longitudinal portions 12 and transverse portions 13, or in step like order, as shown in Fig. 1.

At their rear ends the diverging portions of the frame are rigidly coupled at 14 by a spacer bar or brace member 15, the latter having a rearwardly extending central loop 16.

Obliquely disposed braces 17 are also arranged between the brace 15 and the diverging side members, to reinforce and strengthen the connection.

A clevis device of suitable construction is attached to the forwardly converging portion of the frame to receive the draft appliance.

By this means a strong and rigid frame is produced which will not yield under the severe strains to which it will be subjected when in use.

Attached to the rear face of the portions 10, to each of the portions 13, and to the forward face of the loop 16, are keeper members 18 in spaced vertical relation, each vertical pair of the keepers adapted to support a harrow tooth 19, as shown in Figs. 1, 2, 3, and 4, or to support a cultivator standard, as shown at 20 in Fig. 5, as may be required. Supported in each vertical pair of the keepers is a bearing plate 21 against which clamp screws 22 tapped through the rear of the keepers engage. By this means the teeth or standards may be firmly and adjustably clamped in position.

By arranging the frame side members in step like order, the teeth 19 or cultivator "shovels" do not "trail," but each forms its own furrow and thus operates uniformly on the soil.

The harrow teeth or cultivator standards may be alternately coupled to the frame, thus quickly transforming the device from a harrow to a cultivator or from a cultivator to a harrow, as will be obvious.

The frame member will be constructed from channel metal, as aforestated, and preferably of steel, and as light as possible consistent with the strain to which it will be subjected.

The preferred embodiment of the invention is disclosed in the drawings and set forth in the specifications, but it will be understood that modifications within the scope of the claims may be made in the construction without departing from the principle of the invention or sacrificing any of its advantages.

Having thus described the invention, what is claimed as new is:—

1. A cultivator frame formed from a single bar bent intermediate the ends to form a transverse portion and rearwardly directed portions in spaced parallel relation, and thence directed rearwardly and reversely diverging, the diverging portions being formed with alternating longitudinal and transverse portions, and means for coupling earth engaging devices to said transverse portions.

2. A cultivator frame formed from a single bar bent intermediate the ends to form a transverse portion and rearwardly directed portions in spaced relation and then directed rearwardly and reversely diverging, the diverging portions formed with alternating longitudinal and transverse portions, a transverse brace member connected to the rear ends of the diverging portions of the bar, means for coupling earth engaging devices to said transverse portions, and means for coupling an earth engaging device to said transverse coupling member.

In testimony whereof, I affix my signature hereto.

EDWARD C. HARVEY.